United States Patent [19]
Filippov et al.

[11] 3,844,954
[45] Oct. 29, 1974

[54] ANTIFRICTION MATERIAL
[76] Inventors: Andrei Nikiforovich Filippov,
Vspolny pereulok, 10, kv. 41;
Leonid Rafailovich Gorelov,
Leningradsky prospekt, 75-a, kv.
75; Alexei Georgievich Festa,
Sarinsky proezd, 22, kv. 79;
Alexandr Vasilievich Ostapchuk,
Dmitrovskoe shosse, 183, kv. 149;
Konstantin Antonovich Myshko,
Novomikhalkovsky proezd, 11, kv.
41, all of Moscow, U.S.S.R.

[22] Filed: July 28, 1972
[21] Appl. No.: 275,960

[52] U.S. Cl. .................................... 252/12
[51] Int. Cl. ..... C10m 7/30, C10m 7/26, C10m 7/20
[58] Field of Search ........... 252/12, 12.2, 12.4, 12.6

[56]         References Cited
           UNITED STATES PATENTS
1,054,265  2/1913  Baekland ............................ 252/12
2,097,671  11/1937  Koehring ............................. 252/12
2,581,301  1/1952  Sayevell ............................... 252/12
2,589,582  3/1952  Strughold et al. ..................... 252/12
2,956,848  10/1960  St. Clair .............................. 252/12

Primary Examiner—Daniel E. Wyman
Assistant Examiner—I. Vaughn
Attorney, Agent, or Firm—Holman & Stern

[57]           ABSTRACT

An antifriction material:
  a. 5–20 wt. percent lead
  b. 0.3–3 wt. percent zinc stearate powder
  c. 1–5 wt. percent French chalk
  d. 72–93.7 wt. percent graphite and binder, said binder composed of a major amount of phenol-formaldehyde resin and minor effective amounts of hexamethylenetetramine, stearine, and calcium hydroxide, wherein the binder comprises from about 21.1–26 wt. percent of the mixture of graphite and binder.

2 Claims, No Drawings

ANTIFRICTION MATERIAL

The above-specified ratio and combination of the components ensure the enhancement of the wear-resistance of the component parts operating under dry friction conditions, allow a reduction in the coefficient of friction, and provide for a better running-in of such parts.

BACKGROUND AND SUMMARY OF THE INVENTION

The present invention relates to a graphite-based antifriction material to be used in the manufacture of bearings, reinforced bearings, thrust bearings and other component parts operating, in particular, under dry friction conditions.

Known antifriction material comprises 20-50 wt. percent of lead, 10-40 wt. percent of phenol-aniline-formaldehyde resin and 30-60 wt. percent of graphite with binders containing phenol-formaldehyde resin and an additive including hexamethylene tetramine, stearine and calcium hydroxide.

However, component parts made of this material, which are intended to operate under dry friction conditions at high speeds in co-operation with component parts made of steel or metalloceramic materials, exhibit pronounced wear since, at high sliding speeds, heating of the component parts occurs together with smearing of the material thereof over the end face of the co-operating component part due to the presence of phenolaniline-formaldehyde resin in the composition of the material, as well as due to the above-said ratio between the components and especially to high content of lead.

It is an object of the present invention to eliminate the above disadvantages.

It is another object of the invention to provide an antifriction material which exhibits elevated fluidity during the compression moulding in order to ensure filling of a mould, while component parts made of such material have elevated strength and wear-resistance when cooperating with component parts made of steel or metalloceramic materials, especially under dry friction conditions without elevated heating of the co-operating component parts.

With these and other objects in view, an antifriction material is provided, containing lead and graphite with a binder containing phenol-formaldehyde resin, hexamethylene tetramine, stearine and calcium hydroxide. The antifriction material also includes zinc stearate powder used in an amount of 0.3-3.0 wt. percent and finely divided French chalk used in an amount of 1.0-5.0 wt. percent. The content of the first-mentioned components in percent by weight is as follows:

| | |
|---|---|
| lead | 5-20 | graphite with the binder — the balance.

The use in the antifriction material according to the invention of finely divided French chalk in the above-mentioned percent-by-weight ratio to the components of the material ensures better running-in of the co-operating surfaces and improves their wear-resistance due to the polishing microirregularities of the working surface of the cooperating component part.

The use in the composition of zinc stearate in the above-mentioned percent-by-weight proportions contributes to better running-in of the co-operating component parts and to the reduction of the friction coefficient and wear factor.

The use of lead in the above-mentioned amounts aids in preventing an increase in the operating temperature during contact between the co-operating component parts and ensures elevated wear-resistance of the material.

An increase in the content of graphite with binder in the composition lowers the operating temperature of the cooperating component parts under dry friction conditions and ensures their long-term operation.

It is advantageous that a binder be used in the antifriction material in an amount of 21.1-26 percent of the total weight of graphite with the binder.

An increase in the content of a binder results from the utilization of additional components, such as French chalk and zinc stearate in the composition of the material.

Accordingly, an optimum content of a binder which ensures improved properties of the material under dry friction conditions is in the amount of 22 percent. In the case of friction with possible penetration of moisture, the content of a binder in the composition should be increased and may be as high as 26 percent.

With a content of a binder below 21.1 percent, the strength of the component parts is considerably reduced due to insufficient bond between the particles of the main filler (graphite) resulting from the introduction of additional fillers, i.e., French chalk and zinc stearate.

With a content of a binder above 26 percent technological properties of the material are impaired both in the manufacture of the material itself (smearing of a binder over the rolls) and in the production of component parts of the material (sticking to a mould).

It is advantageous that the binder comprise:

| | |
|---|---|
| phenol-formaldehyde resin | 19-22 |
| hexamethylene tetramine | 1.5-2.5 |
| stearine | 0.4-1.0 |
| calcium hydroxide | 0.2-0.5 |
| in percent by total weight of graphite with a binder. | |

The above-mentioned ratio between the components of the binder with the introduction of additional fillers (lead, French chalk and zinc stearate) in the above-mentioned amounts allows the production of a high-strength material exhibiting good antifriction properties.

Therefore, with this ratio between the components it is possible to obtain a wide range of antifriction materials of different composition, the component parts made of these materials ensuring long-term and reliable operation of friction assemblies under various dry friction conditions in co-operation with component parts made of various materials.

It is advantageous to use the antifriction material according to the invention in making thrust bearings for disengaging friction couplings of vehicle engines, various bearings for machines and instruments and sealing blades for rotary pumps. Component parts made of this material can operate within the temperature range of from −60° to +250°C.

DESCRIPTION OF THE PREFERRED EMBODIMENTS

The antifriction material according to the present invention is prepared in the following manner:

A mixture of thermoplastic phenol-formaldehyde resin, hexamethylene tetramine, stearine or calcium stearate and calcium hydroxide is prepared by mixing the above-mentioned components in a ball mill at a temperature not exceeding 40°C for a period of 3–4 hours.

The above-mentioned phenol-formaldehyde resin is prepared by condensing phenol with formaldehyde in the presence of acidic catalysts, such as hydrochloric acid, with a weight ratio between the reactants of 100:26.5:27.5, respectively.

Graphite (for instance, wastes from electrode manufacture) having an ash content of less than 5 percent and a particle size of less than 2 mm is added into the resulting mixture containing thermoplastic phenol-formaldehyde resin, hexamethylene tetramine, stearine or calcium stearate and calcium hydroxide, and the resulting mixture is mixed in a mixing apparatus for one hour to achieve uniform distribution of the components. The resulting mixture is then rolled at 120°–130°C and ground to obtain a particle size of 0.05–0.16 mm, followed by screening through a sieve of a required mesh.

In order to improve wear-resistance of the material, lead powder, finely divided French chalk with a particle size of less than 0.07 mm, and zinc stearate powder are added into the ground powdery mass.

The resulting mixture comprising the above-mentioned components and used in a required percent proportion is mixed in a mixing apparatus until a uniform mass is obtained.

The above-mentioned uniform mass-moulding powder is dispensed into hot compression moulds.

Where component parts are to be mass-produced on automatic rotary presses, preliminary briquetting of blanks is employed.

Compression moulding is performed at 155°–175°C and under a specific pressure of 300–600 kg/cm².

Residence time under pressure depends upon an article size and is at least 5 minutes.

Thrust bearings for disengaging friction couplings made of the antifriction material according to the invention reliably operate on automobiles and have a long service life.

The antifriction material according to the invention when operating under dry friction conditions possesses the following advantages:

a. ensures long-term reliable operation of a friction assembly with minimum wear and minimum operating temperature of a thrust bearing;
b. makes it possible to manufacture small-size component parts with minimum machining and with complete automation of the production process at high productivity;
c. allows press fitting of the material into a metallic envelope having a reinforced frame during the manufacture of component parts;
d. component parts made of the antifriction material according to the invention have no pores;
e. ultimate compressive strength is 800–1,200 kg/cm².

Optimum composition of the material according to the invention depends upon the conditions of operation of the friction assembly, the temperature, the relative sliding speed of the co-operating component parts, the pressure, and especially upon the material of the co-operating component part.

EXAMPLE 1

A thrust bearing for disengaging a friction coupling of a passanger car of the antifriction material according to the invention, which has the following composition in percent by weight:

| | |
|---|---|
| graphite powder containing 22% of a binder | 87 |
| lead powder | 10 |
| finely devided french chaulk | 2.5 |
| zinc stearate | 0.5 | wherein a content of a binder in graphite is used in percent by weight of graphite with a binder:

| | |
|---|---|
| phenol-formaldehyde resin | 19 |
| hexamethylene tetramine | 2 |
| stearine | 0.7 |
| calcium hydroxide | 0.3 | while a graphite content is of 68, under operational conditions according to the following characteristics:

a. peripheral speed 5,6 m/s,
b. specific pressure 5.5 kg/cm²,
c. material of the co-operating component part-metalloceramic with a hardness HB 180,
d. number of actuations of the thrust bearing — 10 per minute,
e. number of actuations during 22 hours — 13,200.

Under these conditions the thrust bearings made of the material according to the invention had a temperature of the order of 110°–150°C at the friction surface.

A wear of the thrust bearings was of 0.04–0.07 mm.

EXAMPLE 2

In testing a thrust bearing for disengaging a passanger car friction coupling manufactured of the antifriction material having the following composition in percent by weight: graphite powder containing 22 percent of:

| | |
|---|---|
| a binder | 78.7 |
| lead powder | 20 |
| french chaulk | 1 |
| zinc stearate | 0.3 | according to the procedure given in Example 1 a wear of the thrust bearing was of 0.12–0.25 mm. A temperature at the friction surface was of 200°–250°C.

EXAMPLE 3

In testing a thrust bearing for disengaging a friction coupling of a passanger car made of the antifriction material having the following composition in percent by weight: graphite powder containing 22 percent of:

| | |
|---|---|
| a binder | 87.0 |

| | |
|---|---|
| lead powder | 5. |
| french chaulk | 5 |
| zinc stearate | 3 | according to the procedure given in Example 1 a wear of the thrust bearing was of 0.18–0.20 mm. A temperature at the friction surface was of 180–200°C.

In the case where the material was used under dry friction conditions with possible penetration of moisture, a content of French chalk and zinc stearate should be selected at the upper limit: French chalk - 5 percent, and zinc stearate 3 percent with maximum content of a binder in the composition.

What we claim is:

1. An antifriction material consisting essentially of 5–20 wt. percent lead, 0.3–3 wt. percent zinc stearate powder, 1–5 wt. percent French chalk, 72–93.7 wt. percent graphite and binder, said binder composed of a major amount of phenol-formaldehyde resin and minor effective amounts of hexamethylene-tetramine, stearine, and calcium hydroxide, wherein the binder comprises from about 21.1–26 wt. percent of the mixture of graphite and binder.

2. The antifriction material of claim 1, wherein the binder comprises in wt. percent of the mixture:

| | |
|---|---|
| phenol-formaldehyde resin | 19–22 |
| hexamethylene tetramine | 1.5–2.5 |
| stearine | 0.4–1.0 |
| calcium hydroxide | 0.2–0.5. |

* * * * *